United States Patent
Gultekin et al.

(10) Patent No.: US 12,026,622 B2
(45) Date of Patent: Jul. 2, 2024

(54) CONTEXTUALLY GENERATED PERCEPTIONS

(71) Applicant: Chooch Intelligence Technologies Co., San Francisco, CA (US)

(72) Inventors: Hakan Robert Gultekin, San Francisco, CA (US); Emrah Gultekin, San Francisco, CA (US)

(73) Assignee: CHOOCH INTELLIGENCE TECHNOLOGIES CO., San Francisco, CA (US)

( * ) Notice: Subject to any disclaimer, the term of this patent is extended or adjusted under 35 U.S.C. 154(b) by 0 days.

(21) Appl. No.: 17/833,705

(22) Filed: Jun. 6, 2022

(65) Prior Publication Data

US 2022/0300551 A1  Sep. 22, 2022

Related U.S. Application Data

(63) Continuation of application No. 16/263,326, filed on Jan. 31, 2019, now Pat. No. 11,354,351.

(51) Int. Cl.
*G06F 16/583* (2019.01)
*G06F 16/55* (2019.01)
(Continued)

(52) U.S. Cl.
CPC ............ *G06N 3/084* (2013.01); *G06F 16/55* (2019.01); *G06F 16/583* (2019.01);
(Continued)

(58) Field of Classification Search
CPC ... G06F 16/583; G06F 16/55; G06K 9/00711; G06N 20/00
(Continued)

(56) References Cited

U.S. PATENT DOCUMENTS 649,346 A    5/1900  Payne
6,516,091 B1  2/2003  Nagarajan et al.
(Continued)

OTHER PUBLICATIONS

International Search Report and Written Opinion for International Application No. PCT/US2020/015655 mailed dated May 26, 2020, 10 pages.

*Primary Examiner* — Cam Linh T Nguyen
(74) *Attorney, Agent, or Firm* — Klintworth & Rozenblat IP LLP

(57) ABSTRACT

Embodiments of the present invention train multiple Perception models to predict contextual metadata (tags) with respect to target content items. By extracting context from content items, and generating associations among the Perception models, individual Perceptions trigger one another based on the extracted context to generate a more robust set of contextual metadata. A Perception Identifier predicts core tags that make coarse distinctions among content items at relatively higher levels of abstraction, while also triggering other Perception models to predict additional perception tags at lower levels of abstraction. A Dense Classifier identifies sub-content items at various levels of abstraction, and facilitates the iterative generation of additional dense tags across integrated Perceptions. Class-specific thresholds are generated with respect to individual classes of each Perception to address the inherent sampling bias that results from the varying number and quality of training samples (across different classes of content items) available to train each Perception.

2 Claims, 5 Drawing Sheets

(51) Int. Cl.
  *G06N 3/084* (2023.01)
  *G06V 10/764* (2022.01)
  *G06V 10/82* (2022.01)
  *G06V 20/20* (2022.01)
  *G06V 20/40* (2022.01)
  *G06V 40/16* (2022.01)
  *G06N 20/00* (2019.01)

(52) U.S. Cl.
  CPC ............ *G06V 10/764* (2022.01); *G06V 10/82* (2022.01); *G06V 20/20* (2022.01); *G06V 20/40* (2022.01); *G06V 40/172* (2022.01); *G06N 20/00* (2019.01)

(58) Field of Classification Search
  USPC ......................................................... 707/736
  See application file for complete search history.

(56) References Cited

U.S. PATENT DOCUMENTS

| | | | |
|---|---|---|---|
| 6,549,954 B1* | 4/2003 | Lambrecht | H04L 12/42 709/240 |
| 6,636,331 B1 | 10/2003 | Nagarajan et al. | |
| 6,639,692 B1 | 10/2003 | Li et al. | |
| 6,650,439 B1 | 11/2003 | Nagarajan et al. | |
| 7,716,150 B2 | 5/2010 | Cheng et al. | |
| 8,694,540 B1 | 4/2014 | Lin et al. | |
| 9,305,084 B1* | 4/2016 | McCann | G06F 16/954 |
| 10,235,623 B2 | 3/2019 | Lin et al. | |
| 10,474,949 B2* | 11/2019 | Majumdar | G06N 3/08 |
| 2003/0133610 A1 | 7/2003 | Nagarajan et al. | |
| 2009/0319456 A1 | 12/2009 | Consul et al. | |
| 2011/0191271 A1 | 8/2011 | Baker et al. | |
| 2012/0123978 A1 | 5/2012 | Toderice et al. | |
| 2014/0040275 A1 | 2/2014 | Dang et al. | |
| 2014/0075299 A1 | 3/2014 | Ain et al. | |
| 2016/0034512 A1 | 2/2016 | Singhal et al. | |
| 2016/0148515 A1 | 5/2016 | Augusto et al. | |
| 2016/0379091 A1 | 12/2016 | Lin et al. | |
| 2016/0379139 A1* | 12/2016 | Eldar | G06F 16/285 706/12 |
| 2017/0075978 A1* | 3/2017 | Zhang | G06F 40/216 |
| 2017/0116521 A1 | 4/2017 | Wang et al. | |
| 2017/0132526 A1 | 5/2017 | Cohen et al. | |
| 2017/0300818 A1 | 10/2017 | Sinitsyn et al. | |
| 2018/0012143 A1 | 1/2018 | Hansen et al. | |
| 2018/0025012 A1 | 1/2018 | Cao et al. | |
| 2018/0285459 A1 | 10/2018 | Soni et al. | |
| 2018/0307720 A1 | 10/2018 | Yang et al. | |
| 2018/0367290 A1 | 12/2018 | jin | |
| 2019/0005043 A1 | 1/2019 | Hemani et al. | |
| 2019/0012377 A1 | 1/2019 | Liu et al. | |
| 2019/0019106 A1 | 1/2019 | Driscoll et al. | |
| 2019/0034822 A1 | 1/2019 | Farré guiu et al. | |
| 2019/0108747 A1 | 4/2019 | Stenning et al. | |
| 2019/0130185 A1* | 5/2019 | Delaney | G06V 20/62 |

* cited by examiner

CONTEXTUALLY GENERATED PERCEPTIONS

CROSS-REFERENCE TO RELATED APPLICATIONS

This application is a continuation of U.S. patent application Ser. No. 16/263,326, filed on Jan. 31, 2019, entitled "Contextually Generated Perceptions," the disclosure of which is hereby incorporated by reference as if fully set forth herein.

BACKGROUND

Field of Art

The present invention relates generally to the automated generation of metadata from target content, and in particular to the extraction of context to facilitate the automated generation of contextual metadata.

Description of Related Art

From the advent of information retrieval in the 1960s through the explosion of internet-based search engines in the 1990s which led to the ongoing evolution of present-day search technologies, it has become apparent that facilitating the ability to find desired content is of immense value. While the concept of search includes the use of keywords to locate content, it has grown beyond its initial scope and morphed into a much broader notion, spawning a variety of new applications such as content-based searching (e.g., searching for images with an image, video with an image or movie, audio and/or video with an audio clip, etc.), targeted advertising to monetize content, interactive content, augmented reality and many others.

What these different applications share in common is the use of "tags"—i.e., a form of metadata (beyond merely indexing the content itself)—to facilitate the retrieval process. Even today, content authors and providers still often manually add tags (e.g., summary keywords attached to a text document, or to an image, video, song or other content item) to facilitate the retrieval of their content. For example, the "ImageNet" project (one of the world's largest manually curated database of images) provides access to millions of tagged images, including tens of thousands of unique tags.

While quite useful for retrieving known, pre-processed images from a database, the manual process of tagging images has proven cumbersome over time, particularly as authors and content providers amass a large volume of content items. Moreover, relying solely on an author or content provider to generate tags manually risks excluding many relevant tags that could be generated by a "smarter" automated process, which in turn would enhance the "findability" of content.

For these reasons, a number of companies have begun to automate the process of tagging content items. For example, Google provides an online service (at images.google.com) that includes the ability to search into a large collection of web-based images—not only by inputting text-based keywords, but also by uploading any image (reverse image search) or speaking into a microphone (voice search). Being well-positioned at the center of the search universe, Google and its web-crawling functionality have continuous access to a significant subset of web-based images on the Internet which can be searched in different ways.

Many applications, however, require real-time automated tagging of content that has not been seen or processed before. For example, augmented reality typically requires a live analysis of the real world (or a simulated one), and thus automated tagging of live content with additional metadata that is identified and extracted in real time. The "Google Vision" technology provides (through Google's "Cloud Vision API") an image-based search engine that automatically generates tags from any given image. Google has also integrated its "Google Lens" technology into a smartphone mobile app that automatically generates tags and other real-time metadata relating to what the smartphone camera sees (or what the smartphone has stored).

Other similar technologies implement real-time automated tagging of content in the form of standalone applications and APIs that can be integrated into applications across a variety of mobile, desktop, web-based and other platforms. For example, Clarifai focuses on a variety of business-oriented verticals, including media categorization, customer analytics and security, among others. Amazon provides its Amazon Rekognition technology in the form of APIs for integration into applications for facial recognition, text extraction and various other purposes. Markable provides similar technology with a vertical focus on fashion and other visual shopping applications.

In order to perform such tasks, companies often employ neural network "models" that utilize deep learning artificial intelligence (AI) technology—in essence to "predict" the tags and other metadata that are most relevant to supplied or surveyed content. These predictive models are generally "trained" extensively with various different categories of content. However, even as AI technology continues to develop at a dramatic pace, its current implementations exhibit a number of significant shortcomings.

One such shortcoming results from the use of "disconnected" models to generate tags. A single model, no matter how robust, inevitably features a tradeoff between its "coarse tuning" and "fine tuning" capabilities. Consider, for example, broadcast video content from a National Football League (NFL) game. A large image-based model might (based on an analysis of individual video frames) yield tags such as "sporting event," "game" and "football"—i.e., making coarse distinctions from the myriad of other categories of images upon which it was trained (such as furniture, animals, trees, cars, mobile phones and virtually anything else). But that same model is unlikely to make "fine" distinctions necessary to identify the fact that the content portrays an NFL game being played in a specific stadium between particular teams consisting of certain players (much less their positions, particular plays and the score at various different points in time).

One could, of course, build a very specific "fine-tuned" model, such as a text-based model, that is trained solely from a database of pictures of NFL player jerseys. Such a model, however, would have limited utility because it would rely on assumed prior knowledge of the type of content (NFL game video and images) from which it could predict NFL player jersey numbers. Even still, such a model might be unable to identify the particular player wearing a detected jersey number, and might well confuse a player with a fan in the stands wearing a similar football jersey.

In short, individual disconnected models lack context. A model that identifies "coarse tags" such as a sporting event not only fails to recognize more specific "fine tags," but also fails to extract the context necessary to enable other models to identify additional relevant tags. What is needed is a system of "integrated models" that work together synergistically to extract the context necessary to enable each individual model to "play its part" in the process.

Another significant shortcoming of existing automated-tagging systems is their failure to analyze content features at multiple levels of abstraction. For example, while existing models can be employed to detect a variety of different "objects," current systems lack the context to know which objects to identify within a given content item (such as an individual player or a referee within a frame of a broadcast NFL game). Is each blade of grass on the field a relevant object? What about the popcorn vendor in the stands, or the label on each bag of popcorn?

Such context is necessary, for example, to identify the scoreboard (or an on-screen graphic) from which a current score can be extracted. Goals such as identifying players and their jerseys, and the names and numbers imprinted on those jerseys, require the extraction of contextual knowledge to enable individual models (such as image detectors, object detectors, text detectors, facial recognizers, etc.) to analyze relevant features within any given content item. What is needed is a system that employs extracted context across trained models to facilitate in-depth analyses of relevant content item features at differing levels of abstraction.

Yet another shortcoming of existing automated-tagging systems is their failure to address the inherent biases in the training samples employed to train individual models. As a general matter, it is not feasible to normalize the number and quality of training samples among the myriad of different categories of content items. For example, images of certain common items (e.g., chairs) may be more readily available than images of NFL players.

Moreover, the quality of such images (such as their resolution, the lighting and angles from which they are captured and their relative size within a given image, among many other factors) varies widely. These variations among different categories of content item training samples ("sampling bias") significantly affect the ability of any model to identify content it has not previously encountered.

For example, consider two similar categories of content items—chairs and couches. If training sample images of chairs are relatively numerous, and captured with high-resolution from a variety of different angles, as opposed to relatively few low-resolution training sample images of couches (all captured from the same angle), then the resulting trained model is likely to be biased toward predicting that a given image is a chair, rather than a couch. Models typically represent their predictions as percentages (e.g., 87% probability of being a chair), leading users of such models to employ a universal "cutoff" threshold for the purpose of generating binary "yes or no" predictions.

While existing models attempt to account for sampling bias during training (e.g., by controlling the selection of the samples themselves and utilizing "bias nodes"), they ultimately only "balance" feature extraction during training and increase the flexibility of a model to fit its training data. Yet, because the trained model ultimately yields percentages for each prediction, leaving users to employ a single universal threshold across different categories of content items, it still fails to account for biases in the number and quality of training samples across these different content item categories. What is needed is a system that employs varying thresholds across different categories of content items in a manner that accounts for the biases in the available training samples among those categories.

These and other deficiencies are addressed by the present invention, which is summarized below.

SUMMARY

The present invention addresses the deficiencies described above by integrating multiple models to extract context from content items, which it employs to generate contextual metadata (tags) representative of relevant features (within and across content items) while accounting for sampling bias inherent in the training of each individual model. Each such model is referred to herein as a "perception" in that it becomes aware of and interprets content items in context—analogous to the way a human perceives and interprets content via his or her physical senses. A perception should not be confused with a "perceptron"—a term generally used to describe a supervised machine learning algorithm for a binary classifier.

In one embodiment, a "Perception Identifier" model is employed to predict "core tags" that make coarse distinctions among content items at relatively higher levels of abstraction, while also triggering other "Perception" models to predict additional "perception tags" at lower levels of abstraction. In other embodiments, relationships among these models is associative rather than hierarchical (single or multi-level), and includes one-to-many and many-to-many relationships.

To enable the triggering of one Perception model by another Perception model (including the Perception Identifier model), one trained model (i.e., the triggering model) generates predicted sets of tags from content items that were used to train another model (i.e., the triggered model). These sets of tags are "encoded" into (i.e., associated with) the triggered model, such that it will be triggered when the triggering model (upon encountering a content item—e.g., one that it has not encountered before) generates a predicted set of tags that "matches" the encoded sets of tags.

For example, consider the general concept of "fashion" in the context of images of people wearing various items of apparel. The Perception Identifier may be sufficient to distinguish certain high-level apparel categories and generate certain core tags, such as "clothing," "shirt," "pants," "dress" or "shoes" (assuming such items are sufficiently prominent within the image, as discussed below). But if a more robust set of fashion-related tags is desired, multiple Perceptions are created, trained and linked to the Perception Identifier (and to one another in some embodiments).

One Perception may be designed to distinguish types of apparel at various levels of abstraction, perhaps including not only high-level distinctions (e.g., jackets, shirts, pants, skirts and shoes), but also more specific designations of each of those categories or classes (e.g., parka, tee shirt, blue jeans, tube skirts and slippers). Other Perceptions may focus on different aspects of fashion, such as the style of clothing (e.g., vintage, bohemian, preppy and casual), the material (e.g., leather, fur, denim, cotton, wool, silk and other fabrics), the pattern (e.g., plaid, checkered or polka dot) or the different colors and shades (e.g., bone or crème white, rust or carrot orange, cherry or wine red, etc.).

As discussed in greater detail below, the present invention links these Perceptions to other Perceptions based on their contextual overlap at various levels of abstraction. As a result, when a system embodying the present invention is exposed to one or more content items it may not have encountered before (e.g., an image of a person wearing green and white polka dot leather pants), it generates and predicts not only relevant subsets of higher-level core tags (e.g., clothing, apparel and pants), but also relevant subsets of the more specific perception tags described above, which relate to the types, styles, materials, patterns and colors and shades of the apparel featured in such content items.

This process of integrating Perception models via associated sets of tags (explained in greater detail below) effectively extracts context from content items, which enables multiple Perception models to "play their respective parts" in more precisely interpreting such content items by generating/predicting a more robust set of relevant tags than would be generated by individual disconnected models.

As further explained below, training separate individual Perceptions avoids the need to re-train a single broader Perception (such as the Perception Identifier) each time new classes are trained. Re-training larger models is a time-consuming and relatively less effective process due to the requirement for an ever-expanding domain of training samples. By reducing this domain to more precisely targeted individual Perceptions, such Perceptions can be trained relatively quickly with significantly fewer training samples.

Moreover, in one embodiment, the present invention further includes a "Dense Classifier" that facilitates the iterative generation of additional "dense tags" across integrated Perceptions by analyzing individual content items at multiple levels of abstraction. For example, while analyzing a video of vehicles moving along a roadway, the Perception Identifier might predict (with respect to an image from an individual video frame) core tags such as "vehicles," "trucks" and "cars," while other integrated Perceptions might identify additional perception tags (e.g., specifying the location of the roadway, the time of day, the weather, etc.). The Dense Classifier, however, by employing object and other detectors to "zoom in" on certain component objects such as each individual vehicle (including its particular size and shape) and the location of specific features (such as make and model designations, roof type, wheel style and body color), enables the Perception Identifier and other Perceptions to predict more detailed relevant tags than would be possible if each content item was analyzed only as a whole. In other embodiments, these detectors directly generate one or more of these additional tags.

By further reducing the domain of potentially relevant components, the present invention facilitates the iterative prediction of a more robust set of core tags and perception tags (dense tags) not only in the context of the many components within individual content items, but also in the context of multiple content items, such as successive images of vehicles moving along a roadway. In one embodiment, a "Dense Workflow Analyzer" is employed to manage the iterative process of extracting context within and across content items, utilizing that context to identify relevant components within individual content items and employing integrated Perceptions to trigger one another to generate/predict relevant tags. The resulting set of relevant core tags and perception tags (including dense tags) reflects this extracted context.

For example, in this moving vehicle scenario, the Dense Workflow Analyzer manages the process of using the Perception Identifier to extract core tags (such as vehicles, trucks and cars), using image, object, text and other detectors to detect each individual vehicle across multiple video frames, as well as the location of each vehicle's relevant components (such as its make and model designation, roof, wheels, etc.), and using individual Perceptions to predict additional relevant tags (e.g., Toyota, Prius, hatchback, 2018, sunroof and leather interior) from such component images across successive video frames. As discussed in greater detail below, the present invention facilitates the automated generation of predicted contextual metadata that could not otherwise be generated from individual disconnected models analyzing individual video frame images.

Finally, in one embodiment, after training each individual Perception (including the Perception Identifier), "class-specific thresholds" are employed to address the inherent sampling bias that results from the varying number and quality of training samples (across different classes of content items) available to train each Perception. For example, training sample images of a particular class such as "football field" may be relatively more abundant and of greater quality than those of a less common class such as "kickers." To effectively equalize these classes in the context of biased training samples, the present invention generates different thresholds for each class—e.g., employing a lower threshold for images of "kickers" than for "football field" images—in an effort to account for fact that the set of training sample images available for "kickers" is less representative of reality than is the set of training images for "football field" images. As a result, the probability of being either overinclusive or underinclusive in predicting either of these tags is reduced, as is explained in greater detail below.

In another embodiment, APIs are employed to enable customers to supply pre-labeled content items (as well as labels used to search for training samples), thereby facilitating the generation, training and use of additional custom Perceptions. Customers and/or users of a system embodying the present invention also utilize these APIs to supply target content (e.g., one or more content items not previously encountered) to the system, which employs these trained Perceptions to generate a robust set of predicted tags (contextual metadata) relevant to such content.

DETAILED DESCRIPTION

Figure 1:
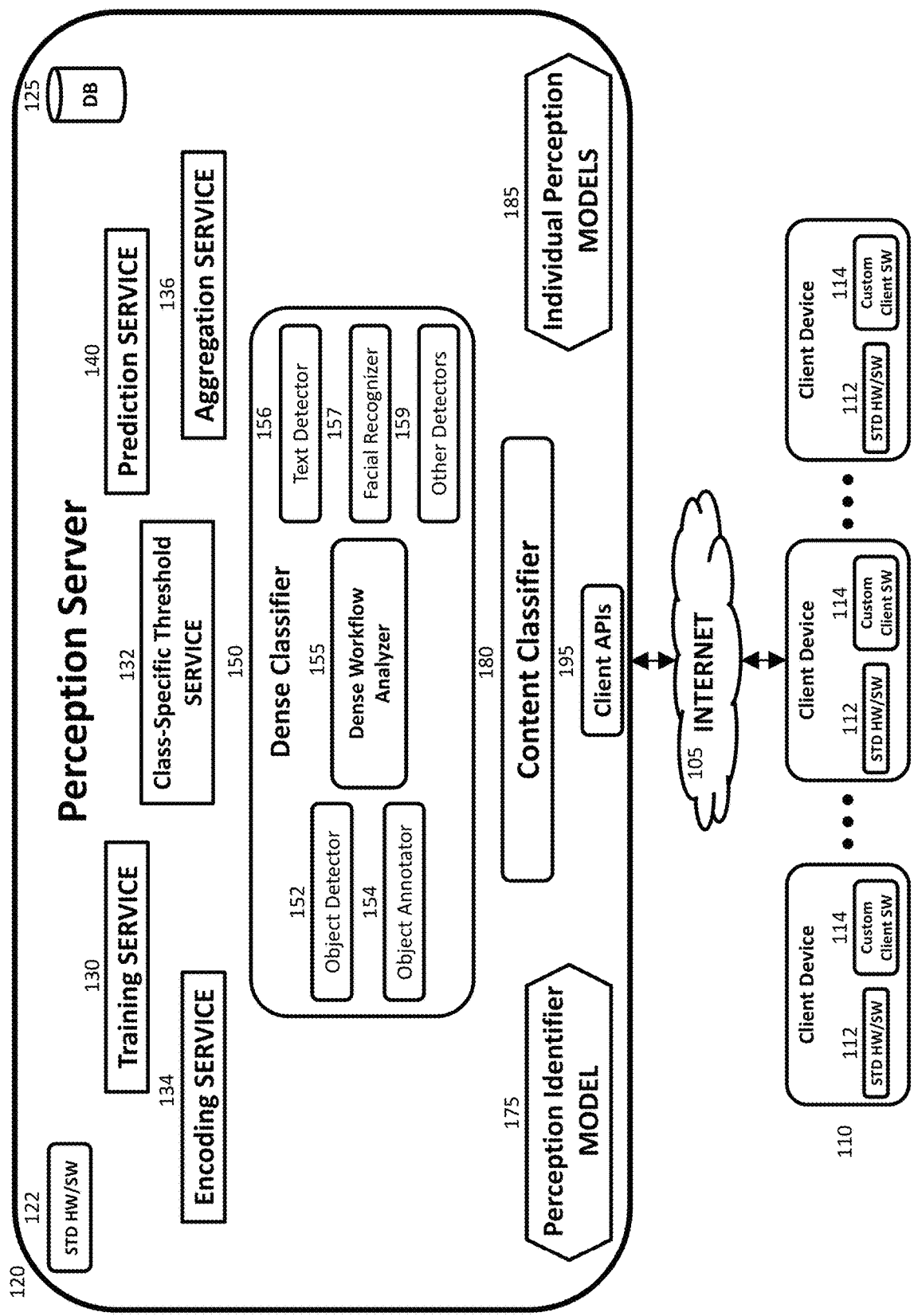
FIG. 1 is a block diagram illustrating an architectural system overview of one embodiment of the present invention.

The following detailed description of the Figures illustrates various embodiments of different aspects of the present invention. While many of the content items discussed below are images (or successive images of a video), It should be noted that the present invention can be employed to generate contextual metadata from numerous different content item media formats, including (without limitation and in combination) images, video, text, audio and 3D objects (as well as component objects within such content items across various media formats). Moreover, the present invention can process such content items individually as well as collectively, whether encountered successively, in parallel or in virtually any other sequence over time.

The term "tag" is used broadly to reference metadata relating to one or more content items, and in particular to reference the contextual metadata generated by the present invention in conjunction with the extraction of context within and across such content items. For example, a tag such as the number "32" may be recognized by virtually any text detector. But, in the context of a broadcast NFL game, that number may serve to identify the name of a particular player due to the number's location on a player's jersey, the colors of which identify the player's team.

In another context, detection of multiple people within an image leads to recognition of their individual facial expressions (resulting, for example, in the generation of "smiling" and "frowning" tags) as well as what each person is wearing (resulting, for example, in the generation of "tee shirt" and "sweater" tags). While tags are typically discussed herein as text (words, phrases, etc.), contextual metadata may also be represented in other embodiments in virtually any other media format, including numbers, symbols, icons and other images, audio, video, structured object formats, etc.

In the process of training individual Perceptions, authors and content providers supply "pre-tagged" content items, such as a group of "labeled" images. In this regard, we use the term "labels" essentially interchangeably with the term "tags" though contextual metadata generated by the present invention is typically referred to as tags, while the term labels is generally reserved for pre-tagged content items.

Moreover, as discussed in greater detail below, the present invention may utilize keywords (e.g., provided by a customer or user) to search for content item training samples. Such keywords may also be considered labels in that they result in the "pre-tagging" of content items (which may themselves also be labeled). It should be noted that such keywords or labels also represent conceptually a category or "class" of content items. When such labeled content items are employed as training samples to train a neural network model or classifier, these labels are often referred to as "classes" in that they represent the internal categories of content items within the trained classifier. Here too, in the context of the present invention, the terms tags, labels and classes are essentially used interchangeably, in that they all refer to metadata relating to one or more content items.

While many advantages of the present invention will become apparent from the following detailed description of the Figures, it should be noted that the integration of multiple models inherently avoids the need to frequently re-train a single large model, while enabling individual models (referred to herein as Perceptions) to be trained more quickly with relatively fewer training samples. As a result, content items need not be "forced" into irrelevant models, which ultimately enhances the accuracy of individual models trained on reduced domains. Many different Perceptions can be trained as needed for different use-case scenarios, as well as to accommodate new categories of content items that are constantly evolving (e.g., new types of vehicles, new models of cellular phones and a vast array of new devices and other objects that either didn't exist in the past or were simply not relevant at a given level of abstraction to a particular use-case scenario).

As discussed in greater detail below, class-specific thresholds are employed (as each individual Perception is trained) to address the inherent sampling bias that results from the varying number and quality of training samples (across different classes of content items) available to train each Perception. These individual trained Perceptions are integrated and associated with one another (e.g., via encoded/associated sets of tags) so as to trigger one another when appropriate to generate a relatively more robust set of additional relevant tags—i.e., ones that take into account the context extracted from within and among individual content items. The Dense Classifier of the present invention enables a further reduction of the domain of relevant components by "zooming" in on relevant "objects within objects" to facilitate the use of various different detectors (image, object, face, text, etc.) to generate tags in the context of that reduced domain.

Finally, it should be noted that the principles of the present invention can be implemented in various different embodiments beyond those illustrated in the Figures. They can be implemented in hardware as well as in various combinations of hardware and software. Perceptions may be implemented as neural networks or other forms of supervised or unsupervised machine learning, or as the result of pure statistical regression or virtually any other manner of generating a predicted set of contextual metadata with respect to one or more given content items.

Moreover, the conceptual components of the present invention illustrated in the Figures can be combined into fewer components, divided into a greater number of components and otherwise reorganized without departing from the spirit of the present invention. Some or all of the functionality of the present invention can be embodied in permanent or transitory physical memory (e.g., stored as software instructions and data), and can be interpreted, compiled, executed and otherwise processed by CPUs, GPUs and other physical processing units.

I. Perception Server and Other System Components

Turning to FIG. 1, system 100 illustrates one embodiment of a system architecture of the present invention. Clients 110 (i.e., "client devices") communicate with the Perception Server 120 via the Internet 105. Different types of client entities (e.g., content authors and providers, end users, advertisers, etc.) communicate with the Perception Server 120 over time (in some cases simultaneously and overlapping in time) through one or more Client APIs 195 for various different purposes.

With respect to models that are already trained, customer clients 110 provide the Perception Server 120 with "target" content (e.g., one or more images, a broadcast video stream, etc.) and receive back "tagged content" which includes the automatically generated tags relevant to the target content. For example, in one embodiment, a client 110 provides a single image and receives back a tagged image—i.e., a set of text tags associated with the image (or overlaid on distinct portions of the image in another embodiment).

The format and file structure of the target content and the tagged content is customizable via Client APIs 195, and differs depending on desired use-case scenarios. For example, in one scenario, a tagged image is displayed with textual tags overlaid on relevant portions of the image (or displayed when the user clicks on or hovers over relevant portions of the image). In another scenario, tagged content items are searchable via keywords (whether identical to or otherwise deemed sufficiently similar to one or more tags to invoke a tagged content item). In a targeted advertising scenario, tagged content items are returned as search results based on the advertiser's pre-selected keywords, and used, for example, to trigger associated advertisements.

In another scenario, the present invention is embodied in a virtual reality ("VR") smartphone app, with the smartphone video camera image including overlaid tags displayed in real time on relevant portions of the image as the smartphone video camera is panned and zoomed. In such scenarios, Client APIs 195 are interactive and include multiple real-time iterations of submitting target content and receiving tagged content. As will become apparent in the discussion below, the various different use-case scenarios are virtually limitless.

In addition to being used for trained models, Client APIs 195 also enable customers, authors, content providers and other users to provide "training sample" content items for use by Perception Server 120 in training one or more individual Perceptions. Here too, the format of the training samples varies with the desired scenario. For example, as discussed in greater detail below, clients 110 may provide labeled images themselves (in virtually any standard or predetermined format) or provide a list of text keywords (and/or phrases) that Perception Server 120 uses to search the web to acquire training sample images. Such keywords then become the classes of a custom Perception (such as types of Helicopters for a custom Helicopter Perception— e.g., "AH-64 Apache," "UH-60 Black Hawk," "CH-47 Chinook," etc.), and ultimately perception tags themselves when generated by Perception Server 120.

Client devices 110 can be virtually any form of physical computing device, such as a server, desktop, laptop, smartphone, tablet or other networked device (including virtual software emulating other devices). A client device 110 includes one or more standard hardware and software components 112, such as processors and memory (with processors executing instructions stored in volatile and/or non-volatile memory), various input and output devices (displays, keyboards, microphones, speakers, cameras, etc.), operating system software and various apps and/or applications. In some embodiments, a client device 110 also includes custom client software 114 to implement desired functionality for the training and/or use of models. Such functionality includes, for example, client-side functionality of a custom Client API 195, a custom app or application (such as the VR app described above) and numerous other custom use-case scenarios (as described in greater detail below).

It should be noted that, in one embodiment, Perception Server 120 processes interactions with multiple different (i.e., otherwise unrelated) client devices 110 simultaneously, both for the training of individual Perceptions and for the use of such trained Perceptions in predicting contextual metadata. For example, one client device 110 may be providing training sample content items to train a custom Perception while other client devices 110 are training different custom Perceptions and still other client devices 110 are supplying target content which Perception Server 120 uses to generate relevant contextual metadata which it returns as tagged content in a predetermined format.

Turning to the conceptual components and functionality of Perception Server 120, it should be noted that Perception Server 120 can be implemented as a single physical server or as a combination of multiple physical servers. Each such physical server includes (as a result of design and engineering tradeoffs) one or more components of standard hardware and software 122, such as processors and memory (with processors executing instructions stored in volatile and/or non-volatile memory), various input and output devices (displays, keyboards, microphones, speakers, cameras, etc.), operating system software and various software applications. As noted above, the components of Perception Server 120 illustrated in FIG. 1 and described below can be combined into fewer components, divided into a greater number of components and otherwise reorganized without departing from the spirit of the present invention.

Communications between Perception Server 120 and client devices 110 are effected via various client APIs 195, as noted above. In other embodiments, Client APIs 195 are implemented in hardware as well as software. The various components of Perception Server 120 described below receive, process and generate data stored in database (DB) 125, which is implemented as a single large database in one embodiment, and as multiple distinct and/or interrelated databases in other embodiments.

In one embodiment, Content Classifier 180 manages the processes both for training Perceptions and for using one or more trained Perceptions to generate contextual metadata. For example, Content Classifier 180 utilizes Client APIs 195 to obtain from a client 110 a set of training sample content items (e.g., labeled images or a list of categories for use in searching for images). It invokes Training Service 130 to train one or more individual Perception models, as discussed in greater detail below.

Following initial training of a Perception, Content Classifier 180 invokes Class-Specific Threshold Service 132 to generate unique thresholds for each class or category of content items within that Perception. It then links that Perception with one or more other Perceptions, employing Encoding Service 134 and Aggregation Service 136 to generate a set of tags from which that Perception will be triggered.

For example, in one embodiment, Encoding Service 134 uses the training samples employed to train each class of the Perception as inputs to trained Perception Identifier model 175, which generates a set of tags for each training sample (e.g., each image) of each class (e.g., each category of images). Aggregation Service 136 is then employed to aggregate these sets of tags into a single set of tags associated with each class of the Perception.

As a result of this process (discussed in greater detail below), each new Perception is not only trained, but linked or associated with one or more other Perceptions such that they can trigger one another to generate additional contextual metadata (e.g., specific perception tags in addition to more abstract core tags). For example, when Perception Server 120 is presented with an image of a couch, Perception Identifier 175 might generate a "sofa" core tag while also triggering a "Sofa" Perception that generates one or more specific perception tags, such as "sectional," "love seat" or other types of sofas.

As noted above, in one embodiment, such Perception models are hierarchical in nature, including a Perception Identifier 175 at a relatively high level of abstraction (i.e., classifying a wide array of different categories of content) which triggers more specific Individual Perception Models 185 (such as a Sofa Perception). In other embodiments, multiple levels of hierarchy are employed. In some embodiments, no Perception Identifier 175 is present and the relationships among Individual Perceptions 185 are entirely associative, with specific Individual Perceptions 185 triggering one another. Different combinations of hierarchical, associative and other types of relationships among Perceptions may be employed without departing from the spirit of the present invention.

When Perception Server 120 is presented with one or more content items for the purpose of generating contextual metadata, Content Classifier 180 employs Prediction Service 140 to utilize relevant (linked) Perceptions to generate such contextual metadata as a predicted set of tags—which are presented to one or more clients 110 via Client APIs 195 in a desired format (e.g., employing a custom predetermined user interface). As alluded to above, Prediction Service 140 employs Dense Classifier 150 to implement an iterative process both within and across content items to generate contextual metadata at multiple levels of abstraction.

This iterative process (discussed in greater detail below) is managed by Dense Workflow Analyzer 155, which employs various other "detectors" that are designed to isolate components of content items from which context can be extracted. Moreover, Dense Workflow Analyzer 155 employs such extracted context across content items to facilitate the determination of which detectors to invoke for particular purposes.

For example, consider a scenario in which a smartphone app embodying the present invention processes video from the smartphone's camera as it pans across a road. Content Classifier 180 employs Perception Identifier 175 to extract, from initial images of video frames, the general context of a "roadway with vehicles." It then invokes Dense Workflow Analyzer 155, which utilizes Object Detector 152 to detect individual vehicles, and then iteratively detect individual cars (as opposed to trucks and other vehicles, which may or may not be of interest in this scenario).

In one embodiment, Object Annotator 154 extracts coordinates on a content item (e.g., an image) of a particular component. For example, Object Annotator 154 may be configured to identify the location within an image of a car of specific features, such as make and model designations, roof, wheels, license plates, etc. Further iterative invocations of Object Detector 152 and Object Annotator 154 (as well as Text Detector 156) by Dense Workflow Analyzer 155 facilitate generation of additional more detailed contextually relevant tags (e.g., hatchback, Toyota, Prius and sunroof). In other embodiments, Facial Recognizer 157 and various other detectors 159 are employed, depending on the particular scenario and the nature and desired level of detail of content item components (as discussed in greater detail below).

It should be noted that, in one embodiment, the various detectors employed by Dense Classifier 150 can be distinguished from Perceptions to the extent they do not directly generate or predict contextual metadata. They nevertheless serve to isolate individual components of content items (e.g., coordinates of relevant "sub-images") which are presented to one or more linked Perceptions to extract context (within and across content items) and generate a more robust set of contextual metadata. By reducing the domain within a content item (e.g., from a roadway image to a vehicle with a specific size and shape to a specific car, and to its roof and wheels) as well as providing context across content items (e.g., identifying the same car across multiple video frames), these detectors enhance the predictive accuracy of Perceptions targeted at such reduced domains. In other embodiments, additional predicted tags are generated by one or more of these detectors.

II. Training of Perceptions

Figure 2:
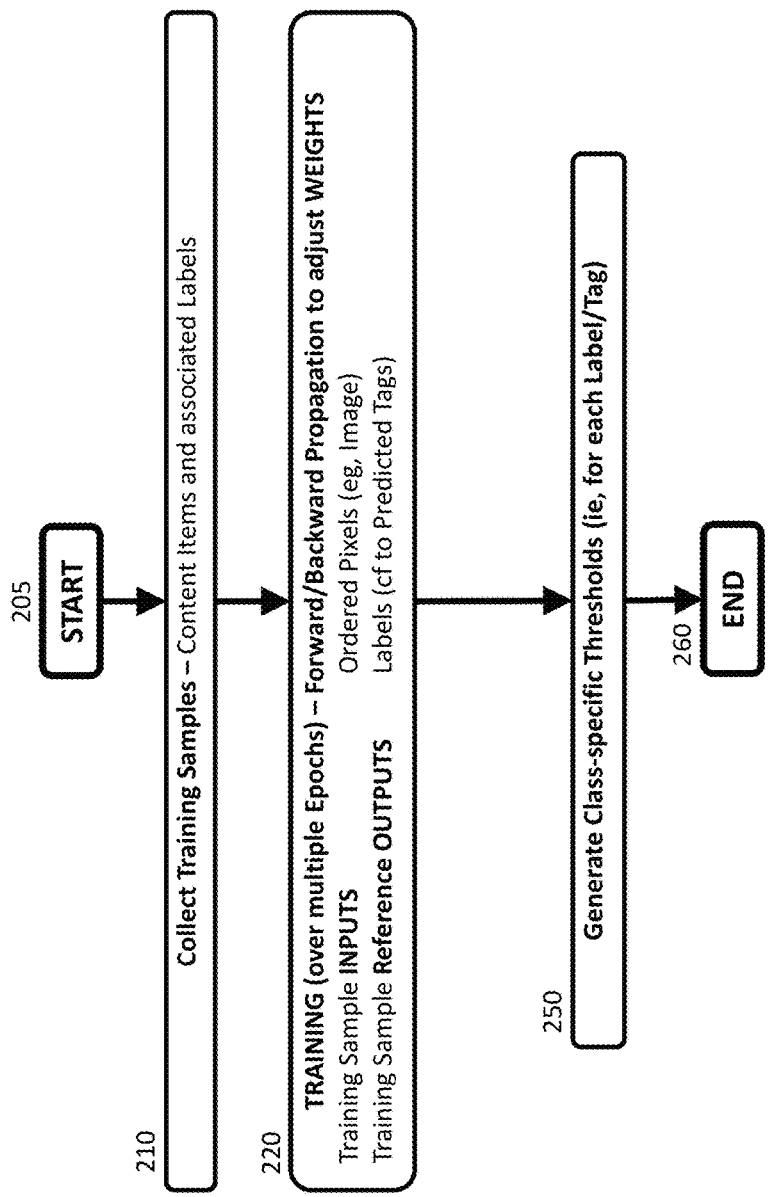
FIG. 2 is a flowchart illustrating key steps of one embodiment of a process for training and refining a Perception Identifier model of the present invention.

Turning to FIG. 2, flowchart 200 illustrates key steps of one embodiment of a process for training and refining a Perception Identifier model of the present invention. As alluded to above, the existence of one or more linked Perceptions 185 (in addition to Perception Identifier 175) minimizes the need to frequently re-train a large Perception, such as Perception Identifier 175, which is a time-consuming process.

Nevertheless, when a completely new concept emerges, the current trained Perception Identifier 175 may itself do a poor job of predicting tags representing that concept (due to its complete lack of training in that area). For example, when "drones" began to enter the public sphere, they slightly resembled helicopters, but were in reality quite different. In that case, the additional few days necessary to re-train a large Perception Identifier 175 were justified by the resulting improvement in the model's accuracy as drones increased in popularity. It should be noted, however, that, at some point, significantly large models (e.g., those having in excess of 10,000 classes) become unwieldy, and tend to perform relatively slowly and exhibit decreasing levels of accuracy.

Yet, when new versions of existing objects (e.g., cars or mobile phones) appear (often on a relatively frequent basis), creating and training a new Perception (or re-training a much smaller existing Perception) may be more appropriate. Similarly, when a new form of architecture is developed (e.g., geodesic domes), re-training Perception Identifier 175 may be unnecessary, as it already recognizes the general concepts of buildings and architecture. Thus, a new Architecture Perception (with geodesic domes as one of its many classes) may represent a better tradeoff. Those skilled in the art will make these tradeoffs between re-training Perception Identifier 175 and creating and training new Perceptions 185 (or re-training existing relatively small Perceptions 185) without departing from the spirit of the present invention.

Nevertheless, Perception Identifier 175 must be trained initially (and perhaps at subsequent convenient infrequent intervals), as indicated in step 205. In one embodiment, Perception Identifier 175 is focused on high-level distinctions among a vast array of categories of content items, and is linked to other Perceptions 185 at a lower level of abstraction in a relatively simple one-level hierarchy. In other embodiments, multi-level hierarchies or "flat" associative relationships (or combinations thereof) are employed.

In step 210, Training Service 130 obtains training samples of content items. In one embodiment, Training Service 130 extracts numerous training samples from existing repositories of labeled images, such as ImageNet. These training samples images and associated text labels (words or phrases which conceptually represent categories of images) have a many-to-many relationship in this embodiment. Training Service 130 processes these training samples into a format for use in training a neural network—in this case, Perception Identifier 175—in step 220.

In this embodiment, for example, each training sample image is represented as an ordered set of pixels, each of which is an input to Perception Identifier 175. Associated text labels are reference outputs which are compared to predicted "tag" outputs to measure the model's predictive "error" during the training process in step 220. Training Service 130 implements an iterative forward and backward propagation process across numerous training samples (including multiple "epochs" or repeated sets of training samples), adjusting model weights until the error is reduced to an acceptable level and Perception Identifier 175 is deemed trained.

At this point, Perception Identifier 175 is capable of predicting core tags at varying levels of probability. However, instead of employing a single "cutoff" threshold (which would yield a subset of potential core tags—i.e., those with probabilities exceeding the single cutoff threshold—but would likely be both overinclusive and underinclusive as a result of sampling biases), Training Service 130 accounts for sampling bias by implementing further refinements (in step 250) to generate a distinct cutoff threshold for each class or category of content items (i.e., for each label or predicted tag).

In one embodiment, in step 250, Training Service 130 employs Class-Specific Threshold Service 132 to submit the entire set of training sample images (again) to trained Perception Identifier 175. For each class, Perception Identifier 175 generates a predicted probability with respect to each of the training sample images associated with that class. Class-Specific Threshold Service 132 then calculates the average ("mean") predicted probability for that class, which it tentatively designates as the "class-specific threshold" for that class. As a general matter, the mean will be higher for classes whose set of training samples is more representative of the class (thereby reducing the likelihood of an overinclusive "false positive"—i.e., where the class/tag is predicted inaccurately).

In another embodiment, to further account for sampling bias, the class-specific threshold is "discounted" by an amount reflecting the relative variance among the predicted probabilities generated by Perception Identifier 175 with respect to each of the training sample images associated with that class. In other words, if these probabilities are very similar to one another (suggesting that the training sample images themselves do not vary greatly from one another), then the discount will be small. On the other hand, if the variance among the probabilities generated with respect to the training sample images is relatively high, then the discount will be relatively larger (thereby reducing the likelihood of an underinclusive "false negative"—i.e., where the class/tag fails to be predicted when warranted).

In one embodiment, Class-Specific Threshold Service 132 determines the amount of the discount by calculating the standard deviation (from the mean) of the probabilities. It then normalize this variance to the domain of probabilities. The result is a relatively larger discount for those classes with relatively greater variance among their generated probabilities. It will be apparent to those skilled in the art that many different functions for calculating the percentage or amount of this discount (i.e., the amount of relative variance among the predicted probabilities) can be employed without departing from the spirit of the present invention.

This process ends at step 260, with each class of trained Perception Identifier 175 having its own distinct class-specific threshold. These class-specific thresholds are stored within the Perception Identifier 175 model itself in one embodiment, and in DB 125 in other embodiments.

Figure 3:
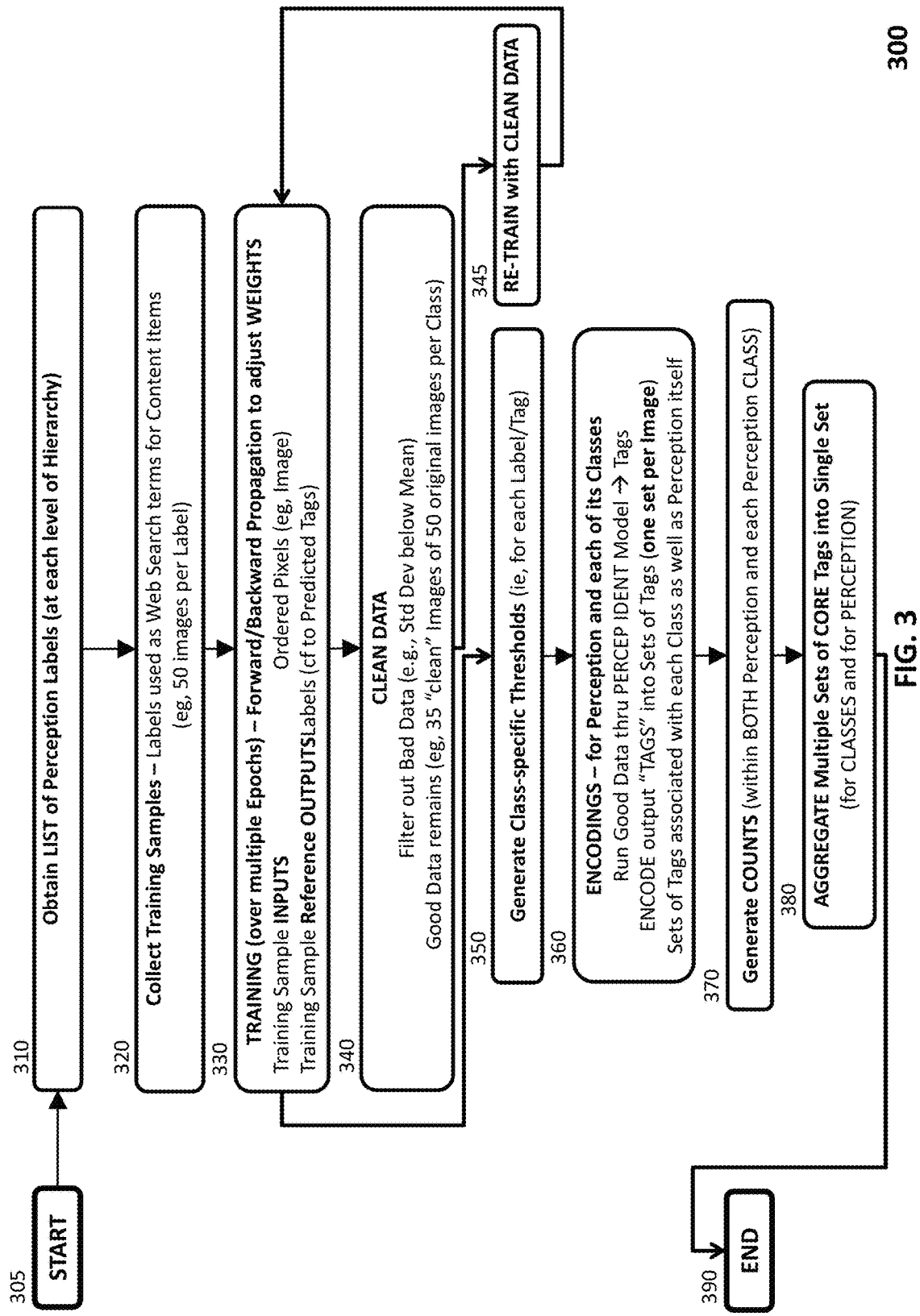
FIG. 3 is a flowchart illustrating key steps of one embodiment of a process for training and refining an individual Perception model of the present invention.

Turning to FIG. 3, flowchart 300 illustrates key steps of one embodiment of a process for training and refining an individual Perception model of the present invention. In other words, having trained Perception Identifier 175 (per FIG. 2 above), and perhaps one or more other Perceptions 185, flowchart 300 further illustrates the manner in which Training Service 130 obtains training samples for a new Perception and, in particular, generates associations with Perception Identifier 175 and other trained Perceptions 185—so that this new Perception can be triggered at relevant times to generate additional contextual metadata with respect to one or more target content items.

This process starts with step 305 whenever a new Perception is desired. For example, in one embodiment, this process is invoked automatically by a client 110 via Client APIs 195. Training Service 130 then obtains from client 110 (in step 310) a list of labels for the desired new Perception. For example, a new "Helicopter" Perception may include a single-level hierarchy consisting of multiple labels, each of which represents a type of helicopter (e.g., AH-64 Apache, UH-60 Black Hawk, etc.) that will be trained as a distinct class of the new Helicopter Perception, and ultimately generated as a predicted tag. In this embodiment, the label "helicopter" itself is also considered a label/class/tag that represents the entire Perception (though it is excluded in other embodiments if it is also a tag of Perception Identifier 175). In other embodiments, the labels may represent a multi-level hierarchy in which classes at various different levels of the hierarchy are triggered by those of other Perceptions (and may themselves trigger classes of other Perceptions).

In step 320, Training Service 130 utilizes these labels to collect training samples for the training of the new Perception. In one embodiment, each label is a word or phrase used as keywords for a web-based text search that yields a set of images as search results. As noted above, the reduced domain of the Perception (e.g., being limited to helicopters), coupled with its association with one or more other Perceptions 185 (as explained below), obviates the need for a large set of training samples to obtain sufficiently accurate predictions. In this embodiment, for example, 50 images corresponding to each label is deemed to be a sufficient number of training samples. In other embodiments, client 110 instead (or in addition) provides labeled images directly to Perception Server 120.

In a similar manner to that noted above with respect to flowchart 200, Training Service 130 processes these training samples into a format for use in training a neural network representing the new Perception. Here too, each training sample is represented as an ordered set of pixels, each of which is an input to the new Perception in step 330, while the associated text labels obtained from client 110 are reference outputs which are compared to predicted "tag" outputs to measure the model's predictive "error" during the training process. And Training Service 130 similarly implements, in step 330, an iterative forward and backward propagation process across numerous training samples (including multiple "epochs" or repeated sets of training samples), adjusting model weights until the error is reduced to an acceptable level and the new Perception model is deemed trained.

In step 340, Training Service 130 eliminates "bad data" that results from the web searches performed in step 320. Training Service 130 "cleans" the data by filtering out "dirty" training samples that are not representative of the class. Such "outliers" are common in the context of web-based search results.

In one embodiment, Training Service 130 submits to the trained Perception (again) the set of training samples used to train each class. The trained Perception generates a predicted probability with respect to each of the training sample images associated with that class. Training Service 130 then calculates the average ("mean") predicted probability for that class, as well as the standard deviation (from the mean) of the predicted probabilities generated with respect to that class. It then excludes each "outlier" training sample of the class—e.g., each training sample with an associated probability at least one standard deviation below the mean. In other embodiments, different calculations may be employed to identify these outliers without departing from the spirit of the present invention.

In step 345, Training Service 130 then re-trains the Perception (repeating step 330) with the "clean data"—i.e., the remaining training samples that were not excluded as outliers. For example, a class trained with 50 training sample images may be re-trained with a subset of 35 "clean" training sample images from the original set of 50 images. Then, in step 350, Training Service 130 employs Class-Specific Threshold Service 132 to generate class-specific thresholds for each class of the new trained Perception (in a manner similar to that described above with respect to step 220 of FIG. 2).

Having trained the new Perception with the clean data, Training Service 130 then employs Encoding Service 134, in step 360, to generate associations with other existing trained Perceptions—so that the new Perception may be triggered when appropriate. In other words, as discussed in greater detail below with reference to FIG. 4, Encoding Service 134 and Aggregation Service 136 facilitate the process of performing "apples-to-apples" comparisons among Perceptions (and their component classes) by generating sets of tags from the different perspectives of the various Perceptions—i.e., creating "real distances" among those Perceptions.

In one embodiment, this is accomplished by having Encoding Service 134 submit to Perception Identifier 175 the clean training samples used to train each class of the new Perception. Employing the class-specific thresholds produced in step 350, Perception Identifier 175 generates a set of core tags for each training sample.

Thus, as a result of step 360, each class of the new Perception is associated with multiple sets of core tags (one for each training sample image). Moreover, the new Perception itself is associated with the cumulative sets of core tags associated with all of the classes of the new Perception. In one embodiment, to enable one Perception (e.g., Perception Identifier 175) to trigger another Perception (e.g., the new Perception), each of these "encoded" associations (multiple sets of tags) is reduced to a single set of tags per class.

To convert multiple sets of tags (e.g., those associated with each class of the new Perception) into a single set of tags, Training Service 130 employs Aggregation Service 136 to generate (in step 370) a "count" of the number of times each unique tag was generated with respect to each class. For example, in a new "Costume" Perception, if Perception Identifier 175 generated a particular core tag (e.g., "red") with respect to 7 training sample images of the "Halloween costume" class and 4 training sample images of the "Spiderman costume" class, then the "class count" of the "red" core tag would be 7 for the Halloween costume class and 4 for the Spiderman costume class, and the "perception count" of the "red" core tag would be 11 for the entire Costume Perception (assuming that the "red" core tag was not generated with respect to any other class of the Costume Perception).

At this point, each class of the Costume Perception has a "class count" with respect to each core tag generated with respect to that class, and the Costume Perception itself has a total "perception count" with respect to each core tag (equal to the sum of the class counts with respect to that core tag). Then, in step 380, Aggregation Service 136 aggregates (for each class of the new Perception) the multiple sets of tags into a single set of tags by eliminating those tags with a class count below a predetermined threshold (e.g., a count of 5 in one embodiment).

As a result, when this process ends at step 390, each class of the new Perception now has a single set of "encoded" (associated) tags, and the new Perception has a single set of encoded (associated) tags equivalent to the union of those single sets. Each of these single sets includes those core tags that are predicted with sufficient frequency to merit inclusion.

In other words, the associated sets of core tags that "connect" multiple Perceptions (and their component classes) represent the context in which it is appropriate for one Perception to invoke another Perception. As discussed in greater detail below with respect to FIG. 4, when Perception Identifier 175 encounters an image in the future, it will generate a set of predicted tags. If those predicted tags "match" the associated single set of an individual class of the new Perception, then the triggering of the new Perception may result in the generation of an additional perception tag (corresponding to that individual class) with respect to the encountered image.

It will be apparent to those skilled in the art that these "encodings" or associations of sets of tags among Perceptions (and among the classes thereof) may be generated by various different algorithms (as alternatives to the methods employed in steps 360, 370 and 380 above) without departing from the spirit of the present invention. Moreover, these associations may be employed not only on a one-to-one or one-to-many basis (e.g., between Perception Identifier 175 and one or more other Perceptions 185 and classes thereof), but also (in other embodiments) on a many-to-many basis among any combination of the Perceptions.

III. Use of Integrated Perceptions to Generate Predicted Contextual Metadata

Figure 4:
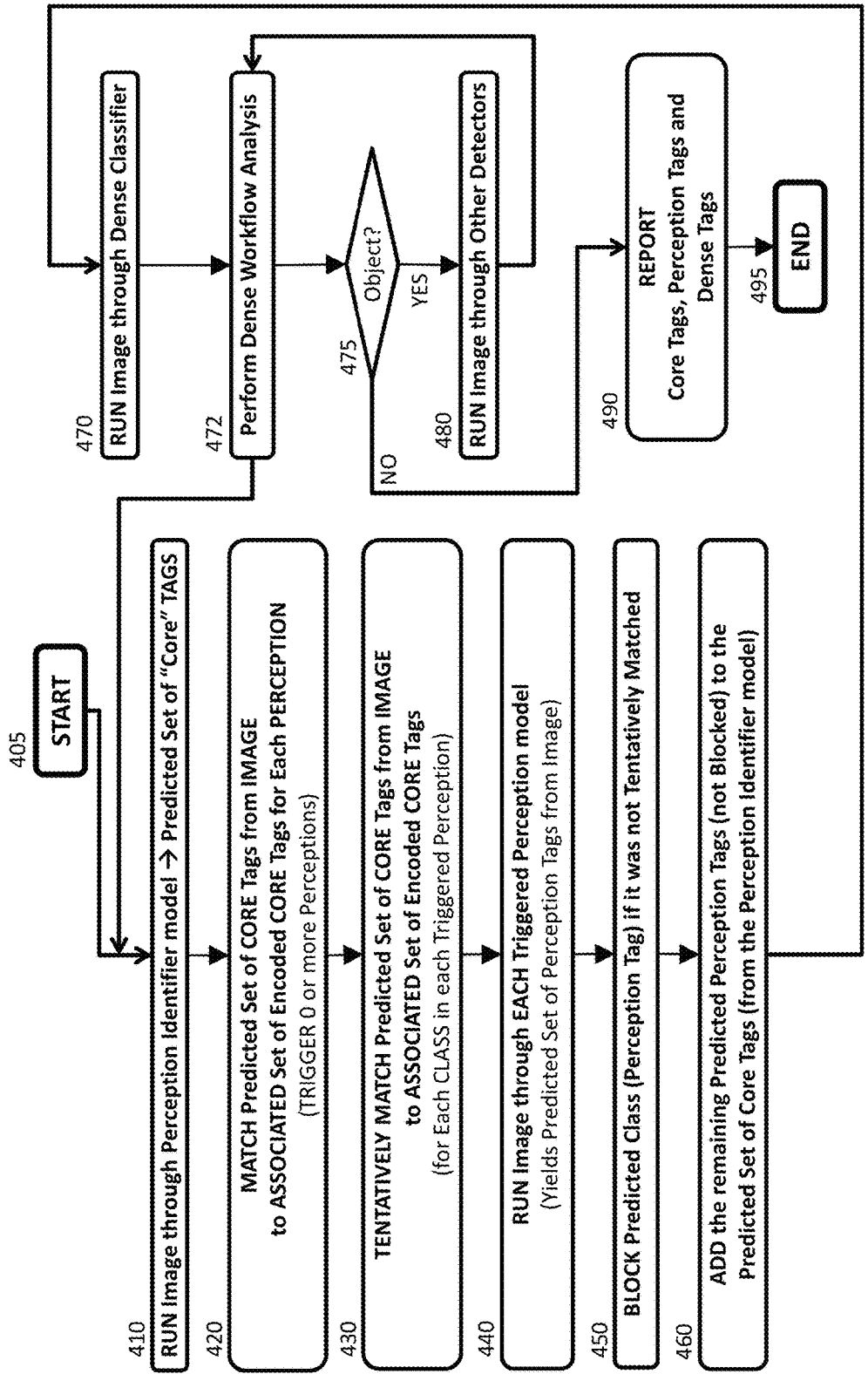
FIG. 4 is a flowchart illustrating key steps of one embodiment of a process for using trained integrated Perceptions of the present invention to generate contextual metadata from one or more individual target content items.

Having described how Perceptions are trained, processed and associated with one another, we now turn to flowchart 400 of FIG. 4, which illustrates key steps of one embodiment of a process for using trained integrated Perceptions of the present invention to generate contextual metadata from one or more individual content items. Starting at step 405, Perception Server 120 obtains from a client 110 (e.g., via Client APIs 195) the desired "target" content for which it will generate contextual metadata.

In the embodiment illustrated in flowchart 400, the target content consists of a single image. In other embodiments, as noted above, such target content (depending upon the use-case scenario) may include content items of one or more different media formats (images, video, text, audio, 3D objects, etc.) delivered to Perception Server 120 individually, collectively, consecutively or in virtually any other sequence over time.

Upon receiving such target content (e.g., a single image), Content Classifier 180, in step 410, initially employs Prediction Service 140 to submit the image to Perception Identifier 175, which generates a predicted set of core tags (employing the class-specific thresholds for each class as discussed above). Prediction Service 140 then determines whether it should trigger other Perceptions 185 (and their component classes) to generate additional perception tags.

In one embodiment, Prediction Service 140 first determines, in step 420, whether there is a "match" between the predicted set of core tags and each set of core tags previously associated with an individual Perception. Prediction Service 140 then triggers each such matching Perception, potentially resulting in the generation of additional contextual metadata (i.e., additional perception tags).

To match two sets of core tags, Prediction Service 140 determines whether the percentage of overlapping tags (e.g., 3 common core tags from a total of 5 unique tags across the two sets) exceeds a predefined threshold (e.g., 50%). In other embodiments, different algorithms may be employed for determining whether there is a "match" among two (or more) sets of core tags without departing from the spirit of the present invention.

For each triggered Perception, Prediction Service 140 then determines, in step 430, whether there is a match between the predicted set of core tags and each set of core tags previously associated with each component class of that triggered Perception. In one embodiment, Prediction Service 140 employs the same matching algorithm it used in step 420, while different algorithms are employed in other embodiments.

The result of step 430 is a set of "tentatively triggered" classes for each triggered Perception. Such triggering is tentative because it is based on matching core tags—i.e., tags corresponding to the domain of classes of Perception Identifier 175, as opposed to the reduced domain of classes more specifically and contextually related to the classes of the triggered Perception. In step 440, Prediction Service 140 then submits the target image to the triggered Perceptions 185, each of which generates a predicted set of perception tags (employing the class-specific thresholds for each class as discussed above).

In step 450, Prediction Service 140 then "validates" each of these tentatively triggered classes to determine whether each such class should be triggered (i.e., whether the predicted perception tag corresponding to each such class should be generated). If a tentatively triggered class of a triggered Perception 185 is not among the corresponding predicted set of perception tags, then that class is "blocked"—i.e., not generated as a perception tag with respect to the target image. In other embodiments, step 450 is skipped and each such class is triggered without validation.

In step 460, Prediction Service 140 compiles the list of tags generated with respect to the target image—i.e., the predicted core tags generated by Perception Identifier 175 and the predicted (and validated) perception tags generated by the various triggered Perceptions 185. In one embodiment, the tag corresponding to the triggered Perception 185 itself is generated as both a core tag and a perception tag, while in other embodiments it is generated as one or the other, but not both.

This list of tags is not yet, however, a complete list. It represents only a single "pass" or "iteration" prior to invoking Dense Classifier 150, which may generate additional core tags and perception tags (dense tags) over multiple iterations with respect to relevant components of the target image (as identified in accordance with the operation of Dense Workflow Analyzer 155). This process, explained below, is subsequently discussed in the context of a particular use-case scenario (a broadcast NFL game) illustrated in FIG. 5.

Having generated this partial list of core tags and perception tags with respect to the target image, Prediction Service 140 (in step 470) submits the target image to Dense Classifier 150, which invokes Dense Workflow Analyzer 155 to implement a workflow corresponding to the relevant use-case scenario. In step 472, Dense Workflow Analyzer 155 initially employs Object Detector 152 to identify relevant component objects within the target image, along with their relevant coordinates within that target image.

Assuming an object is identified (in step 475), Dense Workflow Analyzer 155 (in step 480) employs Text Detector 156, Facial Recognizer 157 and/or various Other Detectors 159 (depending upon the specific workflow corresponding to the relevant use-case scenario) to detect other relevant component objects within the target image (including "feature" objects within other objects). In some cases, these detectors generate predicted tags directly, while in other cases these detectors generate coordinates within the target image that define a "cutout" or sub-image to be submitted to Perception Identifier 175 and/or other individual Perceptions 185.

Depending upon the type of object identified in step 475, Dense Workflow Analyzer 155 employs multiple different types of detectors (in addition to Perceptions) to generate various contextually relevant dense tags. These multiple models effectively work together (under the direction of Dense Workflow Analyzer 155) to accomplish what no individual model could accomplish alone.

For example, Object Detector 152 may, in one iteration, identify the coordinates of individual cars within a target image of a roadway, and may detect, during a subsequent iteration the "car logo" of each car. In one embodiment, Object Annotator 154 is pre-configured to identify desired components of an object at "known" (i.e., determinable) locations within an object. Object Detector 152 may be trained to identify the location of a car logo within an image of a car—e.g., by applying various well-known algorithms with the assistance of Object Annotator 154—while an individual Perception may be trained to identify the brand name of that car logo (e.g., the "BMW" logo).

Similarly, Object Detector 152 may be trained to identify the coordinate location of a title of a book. Dense Workflow Analyzer 155 utilizes Object Detector 152 to extract that location, while employing Text Detector 156 to identify the specific title of the book (e.g., "Gone with the Wind"). In another embodiment, Object Detector 152 is trained to identify the coordinate locations of individual products on a grocery store shelf, as well as the locations of product labels. Even if two bottles of juice (grape juice and cranberry juice) look very similar, the use of Text Detector 156 in conjunction with Object Detector 152 enables them to be distinguished (e.g., via their respective "grape" and "cranberry" labels), and thus prevents each of them from being improperly tagged.

In one embodiment, Facial Recognizer 157 is also trained to identify individual people from a particular domain (e.g., employees of a company, members of a club, etc.). Dense Workflow Analyzer 155 employs Object Detector 152 to extract the coordinate locations of individual people (e.g., at a particular event), and Facial Recognizer 157 to identify the specific people at the event.

In one embodiment, these various detectors are trained in a manner similar to that of individual Perceptions, though without associations to other Perceptions. For example, with reference to FIG. 3 above, training would end after generation of class-specific thresholds in step 350. In other embodiments, as noted above, these detectors may also be implemented as Perceptions.

Returning to step 472, Dense Workflow Analyzer 155 determines how each detected sub-image (object) will be further analyzed. If predicted tags were not yet generated by the detectors (alone or in combination), Dense Workflow Analyzer 155 then submits the sub-image to Perception Identifier 175 by returning to step 410 to perform another iteration of the process described above—i.e., generating contextual metadata (tags) with respect to that sub-image. On the other hand, if the detectors directly generated such tags, then no such additional iteration is necessary.

In either event, Dense Workflow Analyzer 155 then returns to step 475 to detect further sub-images within the original target image (including further sub-images of a previously detected sub-image). Each of these sub-images may reveal additional core tags and/or perception tags (dense tags) with respect to the relevant sub-image. As discussed below with respect to the broadcast NFL game scenario illustrated in FIG. 5, the logic implemented within Dense Workflow Analyzer 155 determines which component objects (sub-images) are relevant, as well as how they are detected and processed.

This iterative process continues until no further relevant objects are detected within the original target image. In one embodiment, this iterative detection of sub-image objects continues until the sub-image is effectively "blurred" because its resolution is insufficient for further object detection. At that point, Perception Server 120 (in step 490) reports to the relevant client(s) 110 (via Client APIs 195) the entire set of contextual metadata with respect to the target content. In one embodiment, this includes core tags and perception tags with respect to each target image, as well as additional dense tags—i.e., core tags and perception tags contextually relevant to components within as well as across multiple of such target images.

This process then ends at step 495. In one embodiment, one or more of these tags is associated with its relevant coordinates, enabling client(s) 110 to utilize such information along with the tags themselves (e.g., in a user interface display, conditional logic or other aspect of a client application).

While the process illustrated in FIG. 4 is described with respect to images as target content, the present invention (as noted above) is equally applicable to content items of one or more different media formats (images, video, text, audio, 3D objects, etc.) delivered to Perception Server 120 individually, collectively, consecutively or in virtually any other sequence over time. Additional features of the present invention, including embodiments of Client APIs 195, are discussed below.

IV. APIs and Additional Features

While Client APIs 195 are employed in one embodiment to obtain target content from and deliver predicted tags to clients 110 in the aggregate, they are employed in other embodiments to deliver such tags over time in virtually any predefined format to accommodate a desired user interface. For example, individual tags may be associated with the target content generally, with an individual content item and/or with any component object of one or more content items.

Client APIs 195 are also employed in the process of training new Perceptions. For example, in one embodiment, a client 110 submits a list of labels and Training Service 130 utilizes each of those labels as keywords in web searches to obtain training samples (e.g., 50 images corresponding to each label). In another embodiment, client 110 also submits labeled images to be used directly as training samples.

To facilitate the training of Object Detector 152, clients 110 submit training samples relevant to the particular type of object being trained. For example, to facilitate the identification of items on a retail shelf, a client 110 may submit images of each type of item, and utilize Object Annotator 154 to identify the "cutout" of desired types of sub-images (such as the location of labels within those images). Training Service 130 utilizes this training data to train Object Detector 152 to "understand" these items so that it can locate such labels when client 110 later submits target content. Similarly, with respect to Facial Recognizer 157, clients 110 may, for example, submit training sample images of employees of a company, along with labels identifying each employee (and perhaps also including other metadata, such as their title, age, etc.).

In one embodiment, once the Perceptions are trained, Perception Server 120 utilizes Client APIs 195 to obtain target content from client 110 and effectively submit that target content to multiple integrated trained Perceptions for the purpose of generating contextual metadata. In other embodiments, clients 110 may selectively enable and disable individual Perceptions and component classes thereof, as well as specified tags that they deem unrelated to their business, vague or generally irrelevant, offensive, etc. Moreover, in one embodiment, a client 110 may generate "private" Perceptions (e.g., satellite imagery of specific locations) that cannot be utilized by other clients 110.

Upon generating contextual metadata relevant to target content submitted by a client 110, Perception Server 120 returns to that client 110 (via Client APIs 195) core tags, perception tags (including dense tags) and various other metadata, such as coordinate locations within certain target content corresponding to particular tags, counts of each tag within the target content (and subsets thereof), etc. As noted above, these tags may be delivered in the aggregate or interactively over time to facilitate a particular user interface or other feature of a client application (as discussed in greater details with respect to various use-case scenarios).

In another embodiment, Perception Server 120 generates "clusters" of tags that tend to be predicted together across the target content. Such clusters are utilized to revise class-specific thresholds in an effort to "tune" already trained Perceptions. For example, if unlikely pairs of tags (e.g., "fish" and "watch") appear together a certain number of times (exceeding a predefined threshold), such an unlikely cluster may indicate that the class-specific thresholds for each of these corresponding tags should be increased. Conversely, if tags that are expected to appear together (e.g., "car" and "wheel") do not appear together with respect to a predetermined number of recent target content items, their corresponding class-specific thresholds may be decreased.

In one embodiment, a clustering algorithm monitors the number of times a tag has been predicted across multiple clusters—i.e., identifying a "primary" tag within each cluster and creating context for that cluster. In another embodiment, the number of occurrence of other (non-primary) tags within each cluster are compared to the number of occurrences of the primary tag in a regressive fashion such that a "sub-cluster" is ultimately generated (i.e., identifying relevant "neighbors" to the primary tag). These algorithms facilitate the "tuning" of the class-specific thresholds of individual Perceptions described above.

In another embodiment, clustering algorithms are employed to identify "outliers" or tags that do not belong to their member clusters. For example, clusters with the same primary tags are compared to identify these outliers (i.e., false positives). If the number of times a particular neighbor has appeared relative to the total number of clusters is unusually low with respect to a predefined threshold (e.g., 3 out of 1000), then such neighbor tags may be deemed outliers, in which case their class-specific thresholds are increased. In one embodiment, the increase is a fixed percentage increase, while in another embodiment it is a percentage increase that varies relative to the degree to which it fell below the predefined threshold.

In one embodiment, Training Service 130 automatically starts and stops individual GPU-based servers during the training process based upon an uploaded XML file training template. As a result, Training Service 130 creates and destroys instances on Amazon AWS servers based on the training demand detected from an individual client 110 or across multiple clients 110 (thereby improving the cost and efficiency of the training process).

In another embodiment, clients 110 are afforded the ability (via Client API 195) to change the tags generated by Perception Server 120 over time. Perception Server 120 monitors these changes and, once a predefined threshold number of such changes is detected with respect to a trained Perception, Training Service 130 automatically initiates a re-training of that Perception (starting and then stopping the relevant GPU servers).

For example, a client 110 might add a label "capo" to describe a guitar clip, in which case Training Service 130 initiates a web search based on that label to obtain training samples, and (assuming the predefined threshold is met) automatically starts and stops the relevant GPU servers to re-train the relevant Perception(s). Similarly, a client 110 may delete a particular tag, in which case corresponding training samples are deleted before (assuming the predefined threshold is met) relevant GPU servers are automatically started and stopped to re-train the relevant Perception(s). Finally, a client 110 may change a tag (i.e., a delete and an add), in which case (assuming the predefined threshold is met) Training Service 130 automatically performs both of the above actions.

Finally, in one embodiment, "person-specific" thresholds are employed following the training of Facial Recognizer 157—in a manner akin to the class-specific thresholds described above. Facial Recognizer 157 trains each class independently. Following the training of a class with respect to the face of a particular person (e.g., Michael Jordan), the training samples (e.g., 10 images of Michael Jordan) are resubmitted to Facial Recognizer 157, which extracts multiple facial features and calculates an average "distance" across the training with respect to each such facial feature. These distances are employed to determine the unique person-specific threshold for Michael Jordan (which may differ from the person-specific threshold of other people). Such person-specific thresholds are employed upon use of the trained Facial Recognizer 157 (i.e., separate independent models for each person) to trigger predictive tags in a manner akin to that of class-specific thresholds described above.

Following are descriptions of use-case scenarios designed to illustrate the operation of the present invention as described above with respect to FIGS. 1-4.

V. Use-Case Scenarios

It will become apparent that the features of the present invention are employed in various different ways in accordance with the requirements of particular use-case scenarios. For example, in one embodiment, Perception Server 120 iterates with a client 110 to provide additional sets of training samples until the predictive sets of tags (with respect to sample target content) are deemed sufficient. In another embodiment, Perception Server 120 "tunes" the algorithms employed to generate class-specific thresholds in a similar iterative fashion—e.g., increasing and/or decreasing class-specific thresholds until a desired threshold of predictive accuracy is achieved.

Once all desired Perceptions are trained, Dense Workflow Analyzer 155 is configured to facilitate the requirements of a particular use-case scenario. The following use-case scenario examples serve to illustrate how the various features of the present invention (including class-specific thresholds, integrated Perceptions and dense classification) work together to extract from target content a robust set of contextual metadata.

Figure 5:
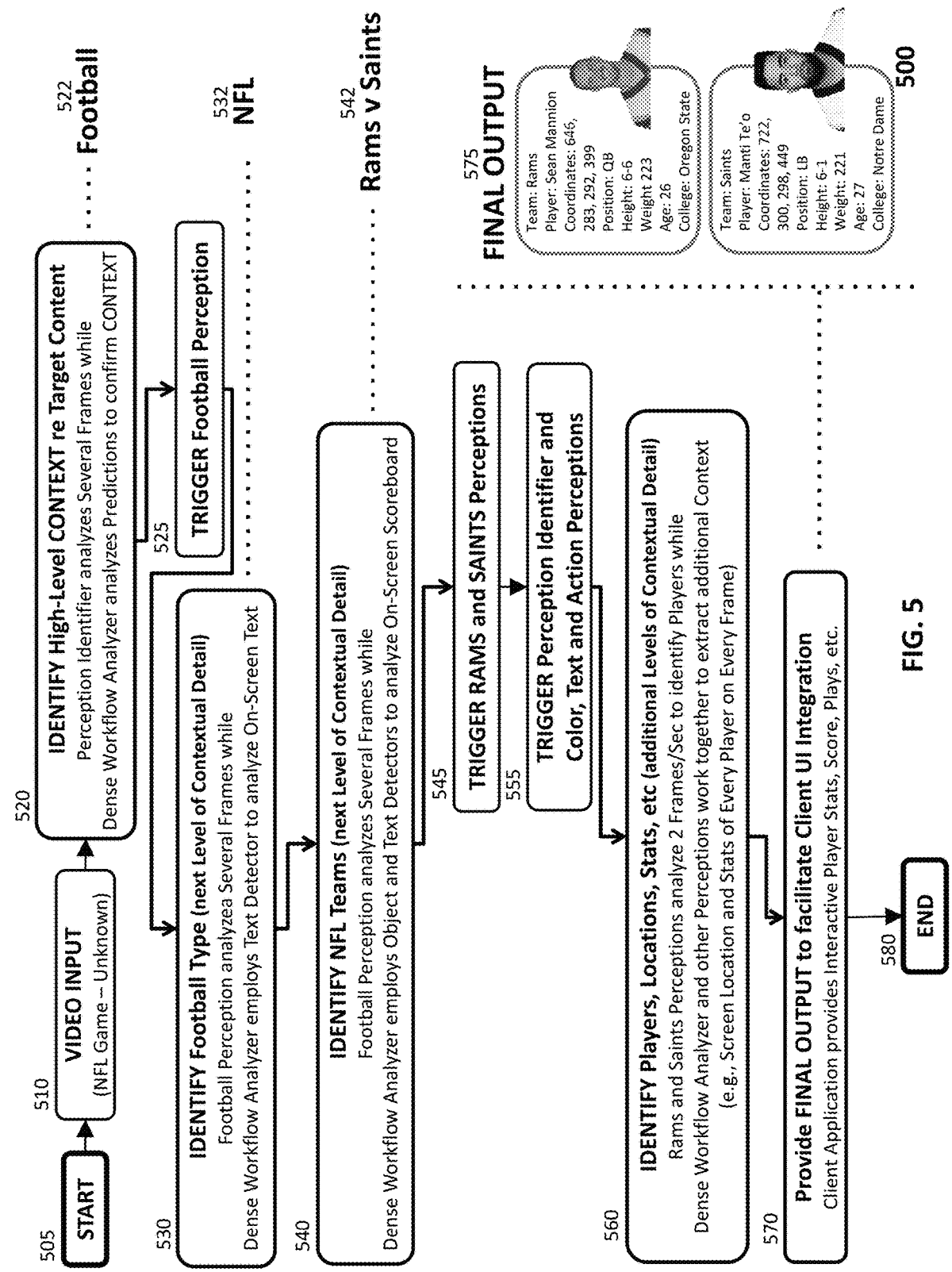
FIG. 5 is a flowchart illustrating key steps of one embodiment of a use-case scenario in which the present invention generates contextual metadata from a video broadcast of an NFL game.

Turning to FIG. 5, flowchart 500 illustrates key steps of one embodiment of a use-case scenario in which the present invention generates contextual metadata from a video broadcast of an NFL game. Perception Server 120 initiates this scenario in step 505. In step 510, it accesses the NFL video broadcast via Client APIs 195 and receives a broadcast stream of successive individual frames. At this point, the substance of the target content is effectively unknown to Perception Server 120.

In step 520, Prediction Service 140 provides successive frames to Perception Identifier 175 to initiate the process of predicting contextual metadata. After Perception Identifier 175 processes the initial frame, Dense Workflow Analyzer 155 manages this scenario by analyzing the resulting predictions of Perception Identifier 175 with respect to several successive frames for the purpose of deriving an overall high-level context. In this example, Dense Workflow Analyzer 155 determines, from these initial frames, that the high-level context is "football" 522.

As alluded to above, the interaction between Perception Server 120 and a client 110 (via Client APIs 195) is defined by the particular use-case scenario. In one embodiment, at this point in the process, Perception Server 120 delivers the "football" core tag to client 110, which utilizes the tag in a smartphone application (e.g., to overlay the tag on the live NFL stream). In another embodiment, client 110 displays tags obtained from Perception Server 120 selectively via an interactive user interface, while in other embodiments the tags are not displayed, but used to select targeted ads. In short, the possibilities for the use of contextual metadata generated by and obtained from Perception Server 120 are virtually unlimited.

In step 525, Prediction Service 140 determines (see step 420 above) that a "Football Perception" should be triggered by Perception Server 120, and does so by submitting successive frames to that Football Perception (in step 530) for the purpose of predicting additional perception tags within the reduced domain of this "football" context. In one embodiment, Football Perception itself directly generates the "NFL" 532 perception tag, indicating that the target content is an NFL football game—a further reduction in the contextual domain of the target content. In another embodiment, this result is accomplished indirectly by Dense Workflow Analyzer 155, which invokes Object Detector 152 and Text Detector 156 to isolate and recognize on-screen text and submit such objects (e.g., "cutout images") to the Football Perception, which generates the NFL 532 perception tag.

As the Football Perception analyzes successive frames of the target content, Dense Workflow Analyzer 155 (in step 540) invokes additional detectors to generate further contextual metadata. For example, Dense Workflow Analyzer 155 employs Object Detector 152 and Text Detector 156 to isolate the on-screen scoreboard and detect the names of the opposing NFL teams—"Rams v. Saints" 542. In one embodiment, this is accomplished directly via the detectors, while in other embodiments additional Perceptions are employed (e.g., to convert NFL team logos into the names of the teams). In yet another embodiment, the home team is also identified "in context" due to the common practice of listing the home team last or on the right side of a "scoreboard."

In step 545, Prediction Service 140 determines that the "Rams" and "Saints" Perceptions should be triggered (e.g., by the Football Perception), and does so by submitting successive frames (including selected sub-images generated by Dense Workflow Analyzer 155) to those Perceptions to extract additional contextual metadata regarding individual players. Moreover, in step 555, Dense Workflow Analyzer 155 employs various detectors to isolate other objects (sub-images), potentially resulting in the triggering of additional Perceptions.

For example, in one embodiment, Object Detector 152 (with the assistance of Object Annotator 154) isolates individual players, as well as their helmets, jerseys, jersey names and numbers field position and "action" orientation (e.g., to facilitate detection of actions such as passing the ball, kicking the ball, etc.). Upon detecting such objects, Dense Workflow Analyzer 155 triggers various Perceptions, including a "Color Perception" (to identify the player's team), a "Text Perception" (to identify the particular player's identity) and an "Action Perception" (to identify the player's position and/or role in the current play).

In step 560, Dense Workflow Analyzer 155 employs each of these other Perceptions to analyze successive frames (or pairs of frames in another embodiment) to extract additional context—i.e., to generate contextual metadata with respect to each player at every point in time (including, in one embodiment, inferential metadata, such as the current score and time on the clock). In step 570, Perception Server delivers this "Final Output" 575 to client 110 via Client APIs 195, at which point this process ends at step 580.

In one embodiment, Final Output 575 includes (for each successive frame) an image of each player on the field along with their name, position (e.g., quarterback), coordinate location within that frame and various other related metadata (e.g., height, weight, age, college, etc.). in other embodiments, static information is delivered to client 110 only once for the sake of efficiency.

It should be noted that client 110 applications can utilize this "raw" contextual data to generate a vast array of much more powerful summary information with respect to individual players, their teams and the game as a whole. For example, an application can identify the plays leading up to each scoring event, the players involved in each play, including significant plays such as completed passes, long runs as well as field goals, touchdowns, etc. In other embodiments, certain desired summary information can be integrated within the logic of Dense Workflow Analyzer 155 and included in Final Output 575.

Moreover, as noted above, client 110 applications can utilize both raw and summary contextual metadata for various purposes involving different data formats and user interfaces. For example, an augmented reality application can overlay certain metadata on the video itself, as well as use individual and collective sets of for the purpose of "matching" targeted advertisements that are displayed interactively within a client 110 (or server-based) application.

Other use-case scenarios illustrate the versatility of the various features of the present invention. For example, in one embodiment, an augmented reality smartphone application is designed to identify contextual metadata relating to the products on the shelves of a supermarket. As a user's smartphone camera pans the supermarket shelves, Perception Server 120 initially detects the high-level context of a "supermarket" while Perception Identifier 175 begins to generate key core tags (e.g., "supermarket" and "shopping cart"). Dense Workflow Analyzer 155 triggers a "Supermarket Perception" and detects product categories (e.g., a "bread" section) as well as individual items, enabling the Supermarket Perception to generate additional perception tags, such as the brand name of a particular bread item.

The relevant core tags and perception tags (including dense tags) are, in one embodiment, overlaid on the image of the items viewed by the smartphone camera and displayed on the smartphone screen. As individual items occupy more of the display screen (e.g., when the user zooms in or moves the smartphone closer to a particular item), Dense Classifier 150 more readily detects details (e.g., logos and text identifying brand and item names, nutritional information, etc.) necessary to facilitate the generation of more relevant contextual metadata.

In essence, Perception Server 120 infers this changing context automatically in response to users' movement of their smartphone and adjustment of its camera settings. Dense Workflow Analyzer 155 continuously adapts to this changing context, employing its various detectors and integrated Perceptions to generate relevant contextual metadata.

In another embodiment, Perception Server 120 employs clustering to identify incorrect tags (outliers). For example, in an augmented reality scenario in which a smartphone user is walking along a riverbank, Perception Identifier 175 detects various core tags, such as "river," "boat," "people," "trees," and an "elephant." A clustering algorithm recognizes that the "elephant" tag is likely an outlier (as it rarely is found together with these other core tags) and increases the class-specific threshold corresponding to the elephant tag, the result of which is the elimination of this outlier tag before it is ever delivered to the smartphone client 110.

In another embodiment, in which no clustering algorithm is employed, the "elephant" tag is displayed on the user's smartphone. Recognizing that this tag is likely an outlier, the user zooms in on the relevant object (e.g., a large boat that was mistakenly interpreted as an elephant). As a result of analyzing this higher-resolution image of the object, Dense Classifier 150 (e.g., via Perception Identifier 175) correctly generates a "boat" tag rather than the outlier "elephant" tag. From the perspective of the smartphone user, zooming in on an object or merely changing the angle of the camera facilitates the Perception Server's "self-correction" of its prior misidentification of an object (even when no clustering algorithm is employed).

In another scenario, the principles of the present invention are employed to facilitate a used bicycle shop's automatic generation of a trade-in price whenever a customer brings in a used bicycle. Having trained a "Bicycle Perception" on many different brands of bicycles in varying conditions (in one embodiment, based on dynamic video as well as static images), the present invention is employed to trigger the Bicycle Perception not only to identify the brand of the bicycle and its age, but also to detect evidence of wear, such as a stretched chain, a worn sprocket and various other functional and cosmetic indicators. Dense Workflow Analyzer 155 implements a trade-in pricing algorithm based upon these factors.

In yet another scenario, the present invention is employed to enable "cleaning robots" to survey the products on a store's shelves and identify whether they are appropriately stacked, correctly displaying promotions, etc. In one embodiment, the robots generate training sample videos (e.g., at night when the store is closed) which eventually enable a triggered "Shelf Perception" to identify whether significant changes have occurred over time—e.g., indicating a poorly stacked shelf area, a "messy" presentation of a particular product promotion or other undesirable conditions upon which the Shelf Perception was trained.

Other scenarios include law enforcement "body cams" for facial recognition (relying on class-specific thresholds for each individual face), video search engines (facilitating searches for objects and other video metadata faster than real-time playback of the video) and remote video analysis (replacing human expert analysis of activity in casinos and remote TSA functions at airports, among others). Governments could employ features of the present invention to identify weapons in a crowd and locations where weapons might be concealed—thereby facilitating more targeted manual searches.

Other more unusual scenarios include public zoos, in which analyses of animals can be performed from a mere video camera, resulting in automated presentations of what animals were doing in the past (given how difficult it may be to capture and interpret certain behaviors), as well as what they are doing in real time. The present invention facilitates detailed and relevant interpretations of the animals' behavior, without requiring that human staff be present to capture specific events, such as eating, mating rituals and a host of different individual behaviors and interactions among the animals.

Another unusual scenario involves trucking companies, in which trucks arriving at a warehouse are scanned based on their brand and other identifiable tasks. The features of the present invention enable the trucks to be identified (e.g., via a text label in a predictable location on each truck) and routed in real time to appropriate docks and other locations.

Finally, it should be noted that the configuration of Dense Workflow Analyzer 155 need not be unique for every different scenario. Many scenarios require common functionality that is addressed via common workflow logic, in which specific object, text, facial and other detectors work together with triggered Perceptions to implement similar results.

As will be apparent to those skilled in the art, various combinations of the functionality described herein may be implemented without departing from the spirit of the present invention. Class-specific thresholds may be employed to minimize "false positives" and to lower the threshold for the number and quality of training samples. Perceptions may be "encoded" in various ways to trigger one another and interconnect various different types of models (including image, object, text, facial and other detectors).

Dense classification may be achieved in a variety of different ways, including iterative analyses of "sub-content"—such as zooming in on an object within an image, and iteratively analyzing sub-images to reveal more robust contextual metadata. Objects that are not the primary focus of a content item may not be recognized until such sub-content is analyzed. This is also true of faces, text labels, items within a store and many other component objects.

Clustering of the tags and other contextual metadata generated by the present invention may be employed before users see such metadata, while dense classification may achieve similar results if clustering is not utilized, or if it fails to identify particular outliers. The Client APIs 195 of the present invention can be employed in a variety of different ways to integrate with a user application's unique user interfaces, data formats and other requirements.

The invention claimed is:

1. A system that generates a plurality of tags relating to one or more target content items, the system comprising:
   (a) a model (embodied in non-transitory computer memory and processed by a physical computer processing unit) which, during a first process for training models, is trained to predict (i) a first tag by submitting to the model a first set of training sample content items pre-tagged with the first tag and (ii) a second tag by submitting to the model a second set of training sample content items pre-tagged with the second tag;
   (b) a first class-specific threshold, stored in the non-transitory computer memory, generated automatically with respect to the number and quality of the first set of training sample content items;
   (c) a second class-specific threshold, stored in the non-transitory computer memory, generated automatically with respect to the number and quality of the second set of training sample content items; and
   (d) a prediction service (embodied in the non-transitory computer memory and processed by the physical computer processing unit) that, when presented with a target content item, utilizes (i) the first class-specific threshold to determine whether the model predicts the first tag and (ii) the second class-specific threshold to determine whether the model predicts the second tag.

2. A system that generates a plurality of tags relating to one or more target content items, the system comprising:
   (a) a model (embodied in non-transitory computer memory and processed by a physical computer processing unit) that is trained to predict a plurality of tags;
   (b) a prediction service (embodied in the non-transitory computer memory and processed by the physical computer processing unit) employed by the model, with respect to a target content item, to determine a subset of the plurality of tags which the model will predict with respect to that target content item; and
   (c) a dense classifier (embodied in the non-transitory computer memory and processed by the physical computer processing unit) employed by the prediction service to extract context from the target content item and to determine from such extracted context one or more dense tags which the model will predict in addition to the subset of the plurality of tags.

* * * * *